United States Patent [19]
Matson

[11] 3,975,507
[45] Aug. 17, 1976

[54] OXIDATION-RESISTANT NICKEL AND COBALT SULFIDES AND METHOD FOR PREPARING SAME

[75] Inventor: Rapheal Fritz Matson, New Orleans, La.

[73] Assignee: Freeport Minerals Company, New York, N.Y.

[22] Filed: Jan. 27, 1975

[21] Appl. No.: 544,498

[52] U.S. Cl. .................................... 423/561; 75/6; 75/7; 75/119; 423/153
[51] Int. Cl.² .................. C01G 51/00; C01G 53/00
[58] Field of Search ........... 423/561, 153, 154, 141, 423/140; 75/.5 B, 119, 224, 6, 7, 82

[56] References Cited
UNITED STATES PATENTS

| | | | |
|---|---|---|---|
| 2,662,009 | 12/1953 | Roberts | 75/119 |
| 2,913,334 | 12/1959 | Dean | 75/119 |
| 3,053,651 | 9/1962 | McGauley | 423/141 |
| 3,453,101 | 7/1969 | Takahashi | 75/82 |
| 3,466,167 | 9/1969 | Illis | 423/150 |
| 3,754,896 | 8/1973 | Iwasaki | 75/119 |
| 3,816,098 | 6/1974 | Mackiw | 75/119 |
| 3,819,801 | 6/1974 | Bell | 75/119 |

OTHER PUBLICATIONS

14904f, Chemical Abstracts, vol. 54.
Delafosse; Denise, et al.; Comptes Rendus. Acad. Sc. vol. 259, July 27, 1964, pp. 807–810.

Laffitte; M.; Bull. Soc. Chim. France, pp. 1211–1233 (1959).

*Primary Examiner*—L. Dewayne Rutledge
*Assistant Examiner*—Michael L. Lewis
*Attorney, Agent, or Firm*—Ronald A. Schapira

[57] ABSTRACT

The sulfides of nickel and cobalt prepared by sulfiding nickel and cobalt-enriched ammoniacal solutions oxidize rapidly (and often pyrophorically) when exposed to normal atmospheric conditions. The oxidized sulfides then react with water present in the atmosphere in a hydration reaction. This oxidation and hydration may increase the weight of the sulfides by as much as 150% or more, depending upon such factors as the type of sulfides involved and the duration of the exposure. However, when nickel sulfide, cobalt sulfide, or mixtures thereof are dried, dehydrated, heated at temperatures of about 1000°F. or higher in a substantially inert atmosphere, and then cooled in a substantially inert atmosphere, the sulfides can surprisingly be exposed to normal atmospheric conditions for prolonged periods of time without undergoing significant oxidation or hydration. Consequently, only minimal weight increases are observed with the treated sulfides. The invention is of particular utility where the sulfides must be shipped from one location to another for further processing and will be in transit or storage for long periods of time.

27 Claims, 2 Drawing Figures

OXIDATION-RESISTANT NICKEL AND COBALT SULFIDES AND METHOD FOR PREPARING SAME

BACKGROUND OF THE INVENTION

This invention relates to oxidation-resistant nickel sulfide, cobalt sulfide, and mixtures thereof, and to a method for preparing such oxidation-resistant sulfides. More particularly, it pertains to oxidation-resistant sulfides on the type prepared by sulfiding ammonical liquors containing nickel and/or cobalt dissolved therein.

It is known in the art that nickel values can be recovered from reduced lateritic ores by leaching the ores with various types of aqueous ammoniacal solutions in the presence of an oxygen-containing gas, e.g., air. Such a process is commonly termed an "ammoniacal leaching process". In this process, certain metals normally associated with the nickel in the ores, e.g., cobalt and copper, are also extracted into the ammoniacal leach solution with the nickel. This is considered undesirable for a number of reasons, and processes have been devised to separate these unwanted components from the nickel-enriched leach liquor.

A common method of removing cobalt, copper, and sometimes various metallic impurities, from these leach liquors is by "selectively" precipitating the cobalt, copper and impurities as a mixture of sulfides, while leaving most of the nickel in solution. This is normally done by treating the pregnant leach liquor with controlled amounts of hydrogen sulfide or any of a variety of other sulfiding agents known to those skilled in the art. Some of the nickel in the leach liquor invariably precipitates with the cobalt, copper, and other impurities despite the selectivity of the precipitation. As a result, the resulting sulfide solids usually contain significant amounts of nickel and cobalt, with varying amounts of copper and impurities. The nickel to cobalt ratio in the sulfide precipitates can vary significantly depending upon such factors as the nickel to cobalt ratio of the ammoniacal solution and the amount of sulfiding agent used. The precipitated solids are usually removed from the main body of the nickel-enriched leach liquor in the form of a slurry, by successive gravity thickening and filtering, or by centrifuging.

I have found that prior to processing the separated slurry to recover the nickel, cobalt, and other metals contained in the solids fraction, it is often desirable to further concentrate the slurry by drying it in a manner that minimizes oxidation of the metal sulfides, e.g., in a non-oxidizing atmosphere. This is especially true if the sulfide material is to be processed in a different location from that where it is produced, and transportation of the material is therefore required. However, once the metal sulfides are dried at normal drying temperatures, e.g., about 300°F. or below, I have also found that they tend to react readily with the oxygen in the air, sometimes almost pyrophorically. When this takes place, the dried sulfides react exothermically with the atmospheric oxygen to produce sulfates, which in turn then react with the water in the atmosphere to form hydrated compounds. Nickel sulfide, for example, may gain up to about 150% or more of its original weight after only a few days exposure due to this type of oxidation and hydration. For these reasons, the dried sulfide material can become difficult and hazardous to handle, transport or ship, thus requiring that special precautions and safety measures be taken. Furthermore, the exothermic reaction between the sulfide and oxygen results in a loss of potential energy that could be advantageously utilized during the subsequent refining of the sulfide for recovery of its metal values. The problem of rapid oxidation can occur with nickel sulfide alone or cobalt sulfide alone, as well as with mixtures of the two, and it is toward a solution of this problem that the present invention is directed.

It is, therefore, an object of this invention to provide nickel sulfide, cobalt sulfide, or mixtures thereof, in a form which is highly resistant to oxidation and thus can be conveniently and safely handled, transported and shipped without undesirable weight gains.

It is another object of this invention to provide a method for preparing such oxidation-resistant sulfides.

It is a further object of this invention to provide a method by which the rate of oxidation normally encountered with conventional nickel sulfide, cobalt sulfides or mixtures thereof can be substantially reduced.

It is a further object of the invention to provide a method for producing nickel sulfide, cobalt sulfide, or mixtures thereof which are substantially less hazardous and easier to handle, transport and ship than conventionally produced sulfides.

It is a still further object of this invention to provide a method for greatly minimizing undesirable weight gains of nickel sulfide, cobalt sulfide, or mixtures thereof during storage or shipment.

These and other objects of the invention will be apparent to those skilled in the art upon consideration of this entire specification and the accompanying drawings.

SUMMARY OF THE INVENTION

The above objectives are accomplished, in accordance with the invention, by removing the unbound and bound water from nickel sulfide, cobalt sulfide, or mixtures thereof, of the type conventionally produced by sulfiding ammoniacal liquors enriched in nickel and/or cobalt, heating the sulfide at a temperature of at least about 1000°F. in the presence of a substantially inert atmosphere, and then cooling the sulfide in a substantially inert atmosphere to a temperature at which the sulfide can be exposed to an oxidizing environment and still retain the beneficial effects of the invention, namely a substantially reduced rate of oxidation and reduced weight gain upon exposure to an oxidizing atmosphere as compared to an untreated sulfide.

The dramatic effect of treatment temperatures above about 1000°F. in drastically reducing weight gains due to oxidation of the sulfide is shown in FIG. 1 of the drawings. Once a sulfide has been deactivated in accordance with the invention, it can be safely exposed to an oxidizing atmosphere, such as normal atmospheric conditions, for prolonged periods of time without undergoing appreciable oxidation and without the hazards of the rapid exothermic oxidation reaction encountered with sulfides not treated in accordance with the invention. This feature permits the treated sulfides to be transported, shipped or stored for prolonged periods of time in safety, without undesirable oxidation and weight gains, and without the need for special handling precautions.

Sulfides deactivated under the preferred treatment conditions of the invention exhibit weight gains less than about 5% over a seven-day period as compared to illustrative weight gains of anywhere from about 80 to 150% or more for untreated sulfides over the same time period. This represents the elimination of as much as 97% of the undesirable weight gain normally associated with the oxidation and hydration of untreated sulfides. Under the preferred treatment conditions of the invention, substantially no weight gains, e.g., only about zero to 3% takes place in the deactivated sulfides, even after prolonged exposure to oxygen, e.g., 7 days. The deactivation also enables maximum retention of the potential energy values of the sulfides during transportation of storage, for recovery in the subsequent refining of the sulfides.

The invention is described in greater detail below in conjunction with the preferred embodiments thereof and the accompanying drawings.

DESCRIPTION OF THE PREFERRED EMBODIMENTS

Figure 2:
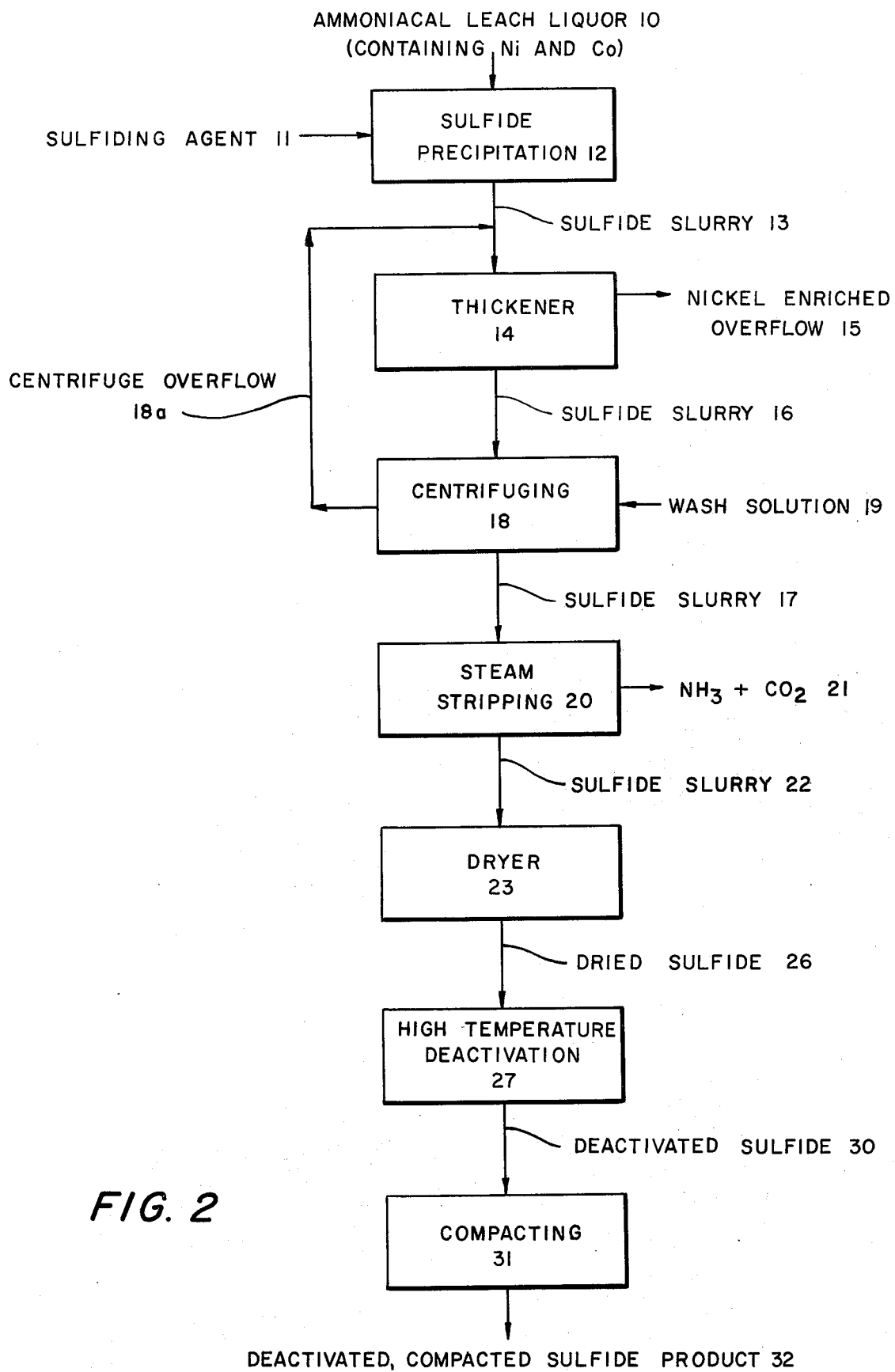
FIG. 2 is a schematic flow sheet illustrating a preferred embodiment of the invention in which a mixture of nickel and cobalt sulfides, prepared by sulfiding an ammoniacal leach liquor containing nickel and cobalt dissolved therein, is deactivated.

Referring now to FIG. 2, an ammoniacal leach liquor 10 containing dissolved nickel and cobalt values is treated with a sulfiding agent 11 such as hydrogen sulfide to selectively precipitate 12 most of the cobalt and some of the nickel as a mixed precipitate of nickel sulfide and cobalt sulfide. Small amounts of copper and various impurities in the leach liquor 10 such as iron or zinc may also precipitate with the nickel and cobalt.

The pregnant leach liquor 10 can be prepared in conventional fashion by treating a reduced lateritic ore enriched in nickel and cobalt values with an aqueous ammoniacal leaching solution in the presence of oxygen. Illustrative leaching solutions include ammonium carbonate, ammonium sulfate, ammonium chloride, ammonium nitrate and other nickel and cobalt ammoniacal leach solutions known to those skilled in the art. Ammoniacal carbonate solutions are preferred leaching solutions. As is known, the nickel and cobalt values of the ore readily dissolve in the ammoniacal leach solution.

Any of a variety of known sulfiding agents 11 can be used in treating the leach liquor 10. Illustrative sulfiding agents include hydrogen sulfide, ammonium sulfide and ammonium hydrosulfide. For a material to be suitable as a sulfiding agent, it need only have the capability of providing sulfide ions in the leach liquor 10 in order to promote the precipitation of the nickel and cobalt as insoluble sulfides. The amount of sulfiding agent used can vary considerably depending upon the objective of the sulfiding such as, for example, whether it is to be a selective or non-selective sulfiding. The sulfiding agent is preferably provided in an amount sufficient to selectively precipitate the cobalt, i.e., to precipitate as much of the cobalt as possible while leaving as much of the nickel as possible in solution. Illustratively, the sulfiding agent is supplied in amounts ranging from about 1 to 4, and preferably about 2 to 4, times the stoichiometric amount required to precipitate all the cobalt in the leach liquor as the sulfide.

Although the deactivation treatment of the present invention can be beneficially applied to nickel sulfide alone, cobalt sulfide alone, or mixtures containing nickel sulfide and cobalt sulfide in any proportions, it is preferably applied to mixtures consisting essentially of nickel sulfide and cobalt sulfide, illustratively having a nickel to cobalt ratio of about 1 to 5, and preferably about 2 to 4 (on a dry basis).

The sulfiding step 12 produces a slurry 13 containing the mixed sulfide precipitates. The mixed sulfide is preferably recovered from the slurry 13 in as concentrated a form as possible prior to subjecting it to the deactivation treatment of the invention. Thus the slurry 13, illustratively containing about 0.1 to 5% by weight solids, is subjected to one or more operations to increase its solids content. For example, it is preferred to first feed the slurry 13 to a thickener 14 where it is separated into a solidsdepleted, nickel-enriched overflow 15 and a solidsenriched underflow 16. The overflow 15 is sent to further processing to recover its nickel content. The underflow 16 is in the form of a thickened mixed sulfide slurry, illustratively containing about 1 to 10% by weight solids. The underflow 16 is then centrifuged 18 and the centrifuged solids-enriched portion washed with an aqueous ammoniacal carbonate solution 19 or other suitable ammoniacal solution. The centrifugate and wash water are combined 18a and recycled for admixture with the slurry 13 from the sulfiding operation.

The slurry 17 leaving the centrifuge 18 has an illustrative solids content of about 10 to 50% by weight. At this point, slurry 17 is stripped 20 with steam to drive off ammonia and carbon dioxide 21 and produce an ammonia and carbon dioxide-depleted slurry 22. Slurry 22 is then dried 23, preferably by spray drying, to produce a high solids feed 26 of mixed sulfides to the thermal deactivation step 27. The slurry 22 is illustratively dried to a fine powder of about 99% solids content, at least about 90% of whose particles are minus 325 mesh in size.

Prior to drying slurry 22, the sulfide solids therein are normally a mixture of the hydrated and non-hydrated forms of the sulfide. Thus one or more of the following compounds is illustratively present prior to drying the slurry 22:

NiS  CoS
NiS . xH$_2$O  CoS . xH$_2$O
Ni(OH)(HS)  Co(OH)(HS)

in which $x$ may be any of a variety of integers, usually in the range of 1 to 5.

The nature of the sulfides after they are dried depends largely upon the temperatures at which they are dried. If drying temperatures are below about 280° to 320°F., the dried sulfides will mostly remain in essentially the non-hydrated and hydrated forms shown above, since only chemically unbound or free water will be removed by the drying step. However, if the sulfides are dried at about 280° to 320°F. or higher, both unbound and chemically bound water such as the water(s) of hydration will be removed leaving only the non-hydrated or anhydrous forms of the sulfides such as NiS and/or CoS. Thus, the temperature at which the wet sulfide is treated in step 23 will determine whether it is merely being subjected to simple drying, i.e., unbound water only is being removed, or whether it is also being dehydrated, i.e., bound water is being removed, in addition to being dried.

While the drying step can be carried out at temperatures of about 100° to 300°F., the sulfide is preferably dried at about 300°F. for anywhere from about 1 to 30 minutes so that unbound and bound water are removed from the sulfide. Generally, it is desirable during drying to raise the solids content of the sulfide to at least about 80% to 90% or more, and preferably to substantially bone dry levels on the order of about 99 to 99+ % by weight.

The drying of the sulfides is preferably conducted in a substantially inert atmosphere such as in the presence of gaseous carbon dioxide or nitrogen, to minimize the degree of oxidation of the sulfide during drying. As pointed out above, the sulfides have a pronounced tendency to oxidize in the presence of air or other oxidizing environments, a tendency which is increased by the temperatures used in the drying operation.

This drying step 23 takes place at temperatures well below those used in the subsequent thermal deactivation step 27. While the sulfide slurry 22 could, of course, be readily dried at the high temperatures prevailing in the thermal deactivation step, it is preferred to subject the slurry to the preliminary lowtemperature drying step 23, separate from the hightemperature thermal deactivation step 27, in order to reduce the volume of material which must be treated in the energy-consuming, high-temperature thermal deactivation treatment. However, if desired, an undried sulfide slurry such as slurry 22 could be fed directly to the high-temperature thermal deactivation step 27, without a preliminary low-temperature drying step such as step 23. In this case, the bound and unbound water would be removed at the high temperatures prevailing in the deactivation step so that the drying (including dehydration) and the high-temperature deactivation treatment would take place substantially simultaneously and in a single treatment step (step 27) instead of the preferred sequence shown in FIG. 2 of two separate treatment steps (steps 23 and 27). In like manner, the sulfide slurry 22 could be heated at a temperature below about 280° to 320°F. in a first treatment step to remove only unbound water, then heated at about 280° to 320°F. in a second subsequent and distinct treatment step to remove bound water, and finally subjected to the thermal treatment 27 as the third distinct and separate treatment step.

In most instances, design considerations and other practical considerations will dictate how and where the drying and deactivation steps should be carried out. Since the undried sulfide slurries are often available as low solids content slurries, those skilled in the art would ordinarily prefer to use a separate drier to remove the unbound and bound water from the slurry solids, and then feed the dried material, containing as little water as possible, to the deactivation equipment.

In the case where the unbound and bound water are removed in two separate treatment steps or, as preferred, in a single treatment step separate from the thermal deactivation step 27, enough water is removed to increase the solids content of the sulfide feed stream to the thermal deactivation step 27 to at least about 80 to 90% or more, and preferably to substantially bone dry levels on the order of about 99 to 99+ % by weight. In the case where the unbound and bound water is to be removed in conjunction with the thermal deactivation step 27, the solids content of the sulfide feed stream to the deactivation step 27 becomes relatively unimportant. Preferably, however, the solids content of the feed stream should be as high as possible in order to reduce energy consumption during step 27.

Returning now to the preferred embodiment shown in FIG. 2, the dried and dehydrated sulfide 26, preferably at substantially a bone dry condition and consisting essentially of non-hydrated nickel sulfide and cobalt sulfide is next subjected to the thermal deactivation treatment 27 in which the dried sulfide 26 is heated at temperatures of at least about 1000°F. in the presence of a substantially inert atmosphere for a time sufficient to produce the desired beneficial effect of reduced weight gain upon subsequent exposure to atmospheric conditions.

Figure 1:
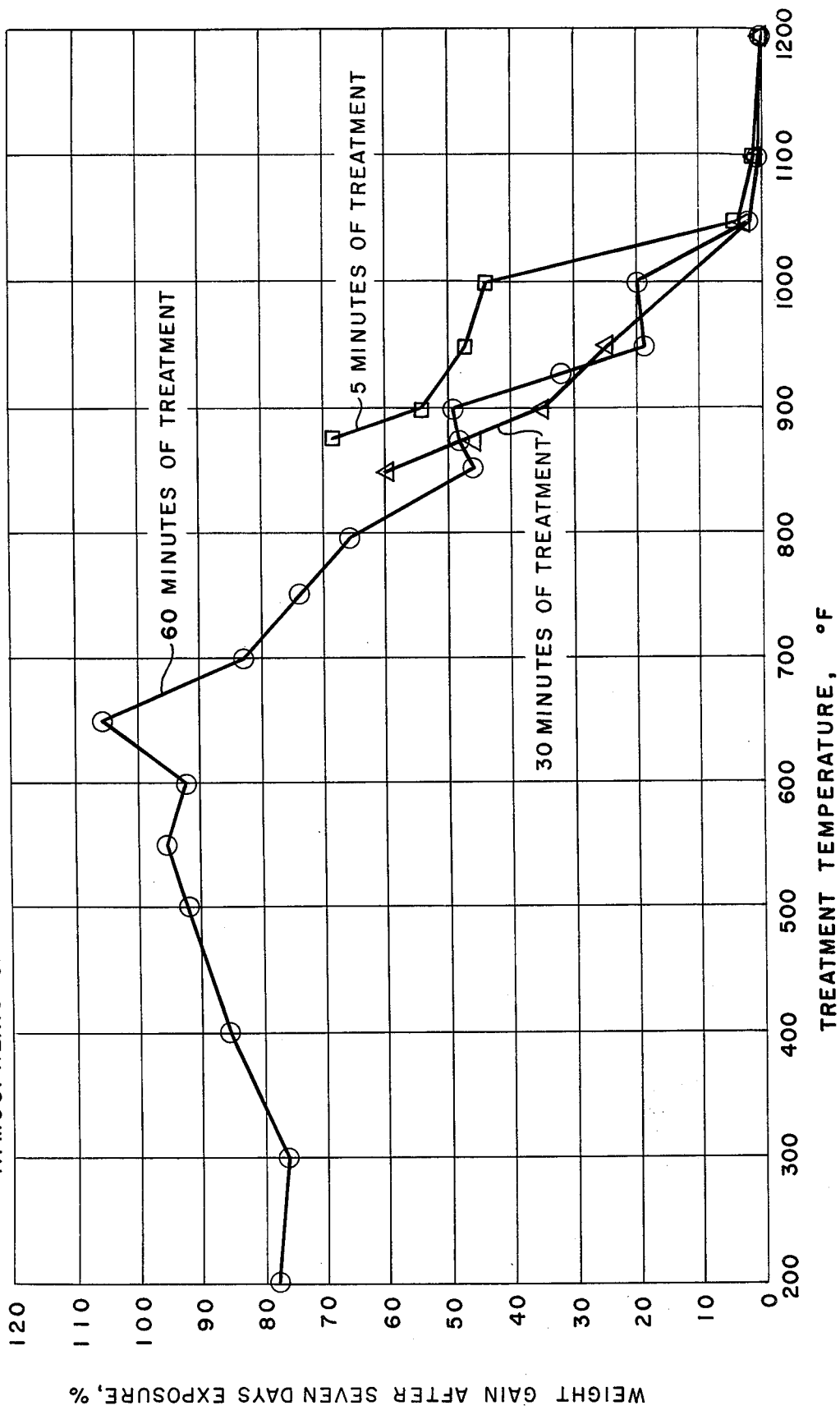
FIG. 1 is a graph showing the dramatic effect of treatment temperatures above about 1000°F. upon the weight gain of a nickel sulfide-cobalt sulfide mixture after exposure of the treated mixture to air at about 70°F. for a period of 7 days.

Preferably, the sulfide 26 is heated at temperatures of about 1050°F. or higher since, as shown in FIG. 1, virtually no weight gain is observed in the sulfide when treated at these temperatures regardless of variations in the time of treatment. It is believed that once a temperature of about 1050°F. or higher is achieved, the deactivation treatment proceeds quickly and in substantially reproducible fashion. As the data in FIG. 1 show, excellent results are obtained in the temperature range of about 1050° to 1200°F. under a variety of widely varying treatment times. Temperatures in excess of 1200°F. can, of course, be successfully used in the practice of the invention, the upper limit of temperature being mainly dictated by economics and the point at which substantial thermal decomposition of the sulfides begins to take place. It has generally been found that treatment temperatures of about 1000° to 1500°F. are satisfactory, with treatment temperatures of about 1050° to 1200°F. preferred.

Time of treatment can vary considerably depending on such factors as the temperature of treatment used and the weight gain which can be tolerated in the sulfide product. Generally, treatment times as short as about one minute will suffice in many instances. The treatment can, of course, be extended as long as desired, although from a practical point of view the treatment would not normally be extended beyond the point where the desired deactivation was achieved. Illustrative treatment times are about 1 to 60 minutes, with treatment times of about 10 to 40 minutes preferred.

The presence of the substantially inert atmosphere during the thermal treatment is, of course, required to prevent the sulfide from oxidizing at the very high temperatures to which it is subjected. By a "substantially inert atmosphere" is meant one in which the concentration of oxidizing agent, reducing agent or other sulfide reactant is sufficiently low that substantially no oxidation, reduction or other chemical reaction between the sulfides and the atmosphere will take place under the conditions in question. Preferably, this inert atmosphere is a non-oxidizing gaseous atmosphere which can be provided by a blanket of any of the well-known inert, non-oxidizing gases such as carbon dioxide, nitrogen, argon and the other rare gases. Inert gases such as carbon dioxide and nitrogen are preferred.

The pressure at which the thermal deactivation of the sulfides takes place is in no way critical. Generally, pressures at or as close to atmospheric pressure as possible are preferred.

After the thermal deactivation treatment at high temperatures is completed, the treated sulfide is cooled while remaining in a substantially inert atmosphere which may be the same as or different from the inert atmosphere present during the thermal deactivation step. The cooled sulfide can be removed from the inert atmosphere and subjected to an oxidizing atmosphere at any temperature below the temperature of the thermal deactivation at which the beneficial effects of the invention will be retained. Thus the inert atmosphere need only be maintained during cooling of the treated sulfide until the sulfide can be exposed to oxygen for prolonged periods of time, e.g., 7 days or more, without undergoing substantial oxidation or experiencing substantial weight gains, e.g., about 5% or higher. The temperature to which the treated sulfide should be cooled before it can be safely removed from the inert atmosphere can depend on a number of factors such as the sulfide involved, the nickel to cobalt ratio in the case of a mixed sulfide, the state of subdivision of the sulfide, the temperature of the deactivation treatment and the duration of the deactivation treatment. In general, however, the treated, cooled sulfide should not be removed from the inert atmosphere until it has been cooled to about 500°F. or less, preferably to about 300°F. or less, and even more preferably to about substantially ambient levels, e.g., about 0° to 150°F. If the treated, cooled sulfide is at too high a temperature when first exposed to an oxidizing environment, e.g., above about 500°F, it may react vigorously with the oxygen, often igniting or catching fire, despite the deactivation treatment. However, at temperatures below about 500°F., this is generally not the case and the highly beneficial effects of the invention in reducing the rate of oxidation and weight gain of the sulfide are observed.

The cooled, deactivated mixed sulfide 30 is illustratively a fine powder at least about 80% of which is minus 325 mesh in particle size. The sulfide 30 is then preferably compacted 31 into the final deactivated mixed sulfide product 32.

Why the deactivation treatment of the invention so significantly inhibits the rate of oxidation of the sulfide is not fully understood at this time. However, it is theorized that as a result of the deactivation treatment the sulfides change from an amorphous state to a crystalline state, their density increases and their chemical structure changes from a hydrated form to one or more anhydrous forms. Although the treated sulfides exhibit remarkable differences from conventional untreated sulfides in their degree of oxidation resistance, they still find useful application in the same uses as do conventionally prepared sulfides.

The following example is provided to further illustrate the invention.

EXAMPLE

This example illustrates the importance of treatment temperature upon the extent to which the rate of oxidation of the sulfide is inhibited. In this example, a nickel sulfide-cobalt sulfide mixture was prepared and then deactivated following substantially the flow scheme outlined in FIG. 2 of the drawings.

Thus, a nickel and cobalt-enriched ammoniacal leach liquor 10 produced by leaching a reduced lateritic ore with an ammoniacal carbonate solution, and containing 10 grams per liter (gpl) nickel, 0.43 gpl cobalt, 70 gpl ammonia, 65 gpl carbon dioxide, and small amounts of copper, iron, and various impurities, was reacted with four moles of hydrogen sulfide 11 per mole of cobalt in solution to precipitate 12 most of the cobalt and copper along with some of the nickel in solution. The resulting sulfide slurry 13 had a solids content of about 0.5% by weight and a nickel to cobalt ratio in the solids of about 3 to 1 (on a dry basis). The slurry was then thickened 14 to produce a solids-depleted leach solution overflow 15 containing 8.7 gpl nickel, 0.04 gpl cobalt, 70 gpl ammonia, 65 gpl carbon dioxide, and minor amounts of impurities, and a solids-enriched slurry underflow 16 containing 3.5% by weight of sulfide solids in leach liquor of the same composition as the overflow 15. The 3.5% solids slurry 16 was then further thickened to a 37% by weight sulfide solids slurry 17 by centrifuging 18.

The thickened slurry 17 was washed in the centrifuge with an aqueous solution 19 containing 10 gpl ammonia and 65 gpl carbon dioxide so that the liquid portion of the 37% solids slurry 17 contained approximately 4 gpl nickel, 0.02 gpl cobalt, 70 gpl ammonia, and 65 gpl carbon dioxide. This 37% solids slurry 17 was then stripped 20 with steam to remove ammonia and carbon dioxide 21, yielding a slurry 22 of 37% sulfide solids in a liquid containing 0.05 gpl ammonia and 0.1 gpl carbon dioxide.

The steam stripped slurry 22 was then dried 23 in a spray drier under the substantially inert atmosphere of a nitrogen blanket. The temperature of the finely divided, powdery material exiting the drier was 300°F. The resulting spray dried product 26 had a solids content of about 99% which was comprised of about 45% nickel, 15% cobalt, 36% sulfur, with the balance made up of minor amounts of ammonia, carbon dioxide, and other impurities.

Samples of the dried mixes sulfide product 26 were then treated at various temperatures between 200 and 1200°F. under an inert nitrogen atmosphere at treatment times of 5, 30 and 60 minutes, respectively. The treated samples were then cooled to about 100°F. while still in an inert nitrogen atmosphere. The cooled samples were weighed and then exposed to the atmosphere, i.e., ambient air at about 75°F., for a period of seven days, after which each sample was again weighed and the weight gain, if any, computed. The samples treated at the temperatures of the invention, i.e., above about 1000°F., analyzed, on the average, about 45.5% nickel, 15.5% cobalt, 36.5% sulfur, with the remainder iron, copper and various impurities. The following weight gains were noted on the samples treated at the temperatures of the invention:

| Treatment time (minutes) | 5 | | | 30 | | | 60 | | |
|---|---|---|---|---|---|---|---|---|---|
| Treatment temperature (°F.) | 1050 | 1100 | 1200 | 1050 | 1100 | 1200 | 1050 | 1100 | 1200 |
| % weight gain after seven days | 4.1 | 1.0 | 0 | 2.9 | 0 | 0 | 1.9 | 0.3 | 0 |

The seven day weight gain of all the samples tested was plotted against treatment temperature for the three treatment times studied. The plot is shown in accompanying FIG. 1 of the drawings.

Referring to FIG. 1, it is seen that treatment temperatures between 200° to about 700°F. had no appreciable effect in significantly reducing the weight gain of the sulfide. In this range of temperatures, weight gains of about 78 to 106% were consistently noted after a seven-day exposure. A perceptible reduction in the amount of weight gained was noticed at temperatures above 700°F., but it was not until temperatures in the range of about 1000°F. were reached that the observed weight gains began to approach the desired low levels which were indicative that the sulfides were in fact being substantially deactivated against reaction with oxygen. By the time a temperature of 1050°F. was reached, weight gains of 5% or less were consistently achieved at all treatment times studied. In the range from 1100° to 1200°F., virtually no weight gain was observed at any of the treatment times studied.

The data in FIG. 1 emphasize the dramatic effect of treatment temperature in reducing the rate of oxidation and weight gain of the sulfides upon exposure to oxygen in the atmosphere. The data clearly establish the important significance of treatment temperatures of about 1000°F. or higher and preferably about 1050°F. or higher, in deactivating the sulfides.

While the data of FIG. 1 suggest that the time of treatment may be of some significance at low treatment temperatures, treatment times become virtually insignificant at the higher treatment temperatures of the invention, and especially at the preferred treatment temperatures of 1050°F. or higher. This is apparent from the fact that all three treatment time curves coalesce into virtually a single curve as the preferred temperatures of about 1050°F. and higher are reached.

As used throughout this specification, numerical temperature values such as, for example, those referred to in connection with the drying step 23 and the high temperature deactivation step 27, refer to the temperature of the nickel sulfide, cobalt sulfide, or mixtures thereof, and not to the gaseous atmosphere or other atmospheres which may surround the sulfide, although in some cases the temperature of the sulfide and its surrounding atmosphere may be the same or substantially the same.

The above example and other specific and detailed information contained herein is by way of illustration only, and such alterations, modifications and equivalents thereof as would be apparent to those skilled in the art, are deemed to fall within the spirit and scope of the invention, bearing in mind that the invention is defined only by the following claims.

What is claimed is:

1. A method for inhibiting the rate of oxidation of a sulfide selected from the group consisting of nickel sulfide, cobalt sulfide, and mixtures thereof, prepared by sulfiding an ammoniacal solution containing dissolved therein nickel, cobalt or a mixture thereof, which comprises
    heating the sulfide to a temperature of about 100°F. or greater to remove unbound water,
    heating the sulfide to a temperature of about 280°F. or greater to remove bound water,
    heating the sulfide to a temperature of at least about 1000°F. in the presence of a substantially inert atmosphere, and
    cooling the heated sulfide to a temperature less than about 500°F, in the presence of a substantially inert atmosphere.

2. The methodd of claim 1 wherein the sulfide is heated at a temperature of about 1000° to 1500°F.

3. The method of claim 1 wherein the sulfide is heated at a temperature of about 1000° to 1200°F.

4. The method of claim 1 wherein the sulfide is heated at a temperature of about 1050° to 1200°F.

5. The method of claim 1 wherein the sulfide is heated for about 1 to 60 minutes.

6. The method of claim 5 wherein the sulfide is heated at a temperature of at least about 1000°F. for 10 to 40 minutes.

7. The method of claim 1 wherein the sulfide is a mixture of nickel sulfide and cobalt sulfide.

8. The method of claim 1 wherein the ammoniacal solution is an ammoniacal carbonate solution.

9. The method of claim 1 wherein the heated sulfide is cooled to a temperature less than about 300°F.

10. The method of claim 1 wherein the heated sulfide is cooled to substantially ambient temperatures.

11. The method of claim 1 wherein the removal of the unbound and bound water takes place during the heating of the sulfide.

12. The method of claim 1 wherein the removal of the unbound and bound water takes place in a single treatment step separate from and prior to the heating of the sulfide.

13. The method of claim 12 wherein enough bound and unbound water is removed in said single treatment step to raise the solids content of the sulfide to at least about 80%.

14. The method of claim 1 wherein the removal of the unbound water takes place in a first treatment step, the removal of the bound water takes place in a second subsequent treatment step, and the heating of the sulfide takes place in a third treatment step subsequent to said second treatment step.

15. The method of claim 1 wherein the sulfide is heated to a temperature of about 100°F. to about 280°F. to remove unbound water.

16. The method of claim 15 wherein the sulfide is heated to a temperature of about 280°F. to about 320°F. to remove bound water.

17. The method of claim 1 wherein the sulfide is heated to a temperature of about 280°F. to about 320°F. to remove bound and unbound water.

18. A method for inhibiting the rate of oxidation of a sulfide selected from the group consisting of nickel sulfide, cobalt sulfide, and mixtures thereof, prepared by sulfiding an ammoniacal solution containing dissolved therein nickel, cobalt, or a mixture thereof, which comprises
    heating the sulfide to a temperature of about 100°F. to about 280°F. to remove unbound water, then
    heating the sulfide to a temperature of about 280°F. or greater to remove bound water, then
    heating the sulfide at a temperature of about 1000° to 1200°F. for a period of about one minute or longer in the presence of a substantially inert atmosphere, and then
    cooling the heated sulfide to a temperature less than about 500°F. in the presence of a substantially inert atmosphere.

19. The method of claim 18 wherein the bound and unbound water are removed in a single treatment step by heating the sulfide at a temperature of about 280° to 300°F. to increase the solids content of the sulfide to at least about 80% by weight.

20. The method of claim 18 wherein the bound and unbound water are removed in a single treatment step in an amount sufficient to increase the solids content of the sulfide to at least about 90%, the sulfide is a mixture of nickel sulfide and cobalt sulfide, the mixture is heated at 1000° to 1200°F. for about 10 to 40 minutes and then cooled to a temperature less than about 300°F.

21. The method of claim 18 wherein the sulfide is heated to a temperature of about 280°F. to about 320°F. to remove bound water.

22. A method for inhibiting the rate of oxidation of a mixture of nickel sulfide and cobalt sulfide, prepared by sulfiding an ammoniacal solution containing dissolved therein nickel and cobalt, which comprises heating the sulfide to a temperature of 280°F. or greater to remove bound and unbound water in a single treatment step, then heating the sulfides at temperatures of about 1000° to 1200°F. for about 1 to 60 minutes in the presence of a substantially inert atmosphere, and then cooling the heated sulfide to a temperature less than about 500°F. in the presence of a substantially inert atmosphere.

23. The method of claim 22 wherein the ammoniacal solution is an ammoniacal carbonate solution.

24. The method of claim 22 wherein the unbound and bound water are removed by heating the sulfide at a temperature of about 280° to 320°F.

25. The method of claim 22 wherein the unbound and bound water are removed by heating the sulfide at a temperature of about 300°F.

26. The method of claim 22 wherein said substantially inert atmosphere is a gas selected from the group consisting of nitrogen, carbon dioxide and argon.

27. The method of claim 22 wherein the sulfide is cooled to less than about 300°F.

* * * * *